(12) United States Patent
Panditharadhya et al.

(10) Patent No.: US 7,237,207 B2
(45) Date of Patent: Jun. 26, 2007

(54) MAPPER COMPILER

(75) Inventors: Nagalinga Durga Prasad Sripathi Panditharadhya, Redmond, WA (US); Udaya Kumar Bhaskara, Redmond, WA (US); John David Dallard, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/736,406

(22) Filed: Dec. 15, 2003

(65) Prior Publication Data

US 2005/0132282 A1      Jun. 16, 2005

(51) Int. Cl.
G06F 5/00 (2006.01)
G06F 9/44 (2006.01)

(52) U.S. Cl. .................. 715/805; 715/763; 717/109

(58) Field of Classification Search .......... 715/805, 715/763, 810, 746, 853, 823, 765; 709/223, 709/224; 717/109, 125
See application file for complete search history.

(56) References Cited

U.S. PATENT DOCUMENTS

| 5,870,559 | A  | * | 2/1999  | Leshem et al. ............. 709/224 |
| 6,237,006 | B1 | * | 5/2001  | Weinberg et al. ....... 707/103 R |
| 6,636,845 | B2 |   | 10/2003 | Chau et al. .................... 707/1 |
| 6,643,633 | B2 |   | 11/2003 | Chau et al. .................... 707/1 |
| 6,662,957 | B2 |   | 12/2003 | Zurcher et al. ............. 215/247 |

* cited by examiner

Primary Examiner—Cao (Kevin) Nguyen
(74) Attorney, Agent, or Firm—Woodcock Washburn LLP

(57) ABSTRACT

Mapping between a source object and a destination or target object uses techniques and functoids that provide an auto-linking feature in which mappings are automatically provided based solely on source and target field names, or, ignoring field names, field locations within hierarchy. Functoids provide support for callout to programming artifacts, such as custom programming logic embedded in .NET assemblies or custom XSLT, and table-looping to generate and map data into a target document even though that data did not exist in the map input.

24 Claims, 10 Drawing Sheets

MAPPER COMPILER

FIELD OF THE INVENTION

This invention relates in general to the field of mapping a source object with a target object. More particularly, this invention relates to message transformation features and functoids used in mapping.

BACKGROUND OF THE INVENTION

Translation tools exist that allow a user to create a correspondence between the records and fields in two different specification formats (e.g., a source object and a destination or target object). For Example, MICROSOFT® BizTalk Mapper is a highly graphical tool that presents the user with both source specifications and destination specifications side-by-side and lets the user define transformations by drawing lines between records, fields, and functoids. Functoids perform operations that range from simple calculations to elaborate script functionality.

BizTalk Mapper uses an Internet standard called Extensible Stylesheet Language (XSL) Transformations (XSLT), which is a W3C standard or language for transforming Extensible Markup Language (XML) documents from one XML schema into another.

Thus, the BizTalk Mapper is used to define a structural transformation of a message from one format/syntax to another. A graphical user interface exists to represent a textual transformation language (e.g., XSLT) by providing a compiler for the visual representation. The Biztalk Mapper supports creation of XSLT without requiring any knowledge of that language (and, in fact, without ever showing the XSLT at all unless the user specifically is looking for it). This is desirable because message transformation is an application integration activity that is typically performed by business analysts and those not likely to understand the transformation language (XSLT) itself.

BizTalk Mapper supports a variety of mapping scenarios that range from simple, parent-child tree relationships to detailed, complex looping of records and hierarchies. When the mapping process is complete, a serializer component uses the specification to create a file format that can be recognized by a trading partner or internal application. BizTalk Mapper also includes a style-sheet compiler component that takes the visual representation of the map and creates an XSLT style sheet.

One of the difficulties of simplifying the XSLT definition using a graphical depiction is the fact that some of the power of XSLT does not lend itself well to graphical depiction at all. Similarly, XSLT transformations are not typically intended to create data so much as to move it from one hierarchical location to another. XSLT also has limited support for what is often referred to as "rich" transformation, modifying data as it is moved from source to target location using programming-like capabilities (e.g. UpperCase, etc.).

Moreover, one of the most time consuming parts of mapping is the process of ensuring that all fields are mapped. In many cases, this can amount to drudge work, where the mappings are known and obvious, but still require manual connection.

In view of the foregoing, there is a need for systems and methods that overcome the limitations and drawbacks of the prior art.

SUMMARY OF THE INVENTION

The present invention is directed to message transformation, or mapping, between a source object and a destination or target object using techniques and functoids that minimize or overcome the above mentioned shortcomings. The source and target objects may be schemas, spreadsheets, documents, databases, or other information sources, and the graphical mapping indicia may include link indicia and/or function objects linking nodes in the target object with nodes in the source object. The mapping may be compiled into code used by a runtime engine to translate source documents into target documents, for example, in business to business information exchange applications.

According to aspects of the present invention, an auto-linking feature is provided in which mappings are automatically provided based solely on source and target field names, or, ignoring field names, field locations within hierarchy.

Function objects or functoids in the mapping region provide "rich" transformation features and use callouts to programming artifacts, such as custom programming logic embedded in .NET assemblies. The support for callout to assemblies enhances runtime performance. Further, the callout has been expanded to include support for custom XSLT. Thus, a user who desires to define XSLT directly may do so. Moreover, the full power of XSLT can be brought to bear upon any message transformation problem, without the sometimes difficult task of figuring out the correct graphical representation to achieve the desired result.

According to other aspects of the present invention, a table-looping functoid generates and maps data into a target document even though that data did not exist in the map input. The map creator defines a list of constants and/or dynamic (source message, database, etc.) values in a list. The list is then used to populate a grid. The user can define as many rows and columns in the grid as desired, and then a looping behavior is compiled based on the grid. XSLT has the ability to iteratively map something in a loop. By combining that ability with the concept of that loop being driven by a table, the result is that the map can create data which can be hierarchically flat or complex, and XSLT can be generated, by compiling the graphical representation, to build the desired map output.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 1:
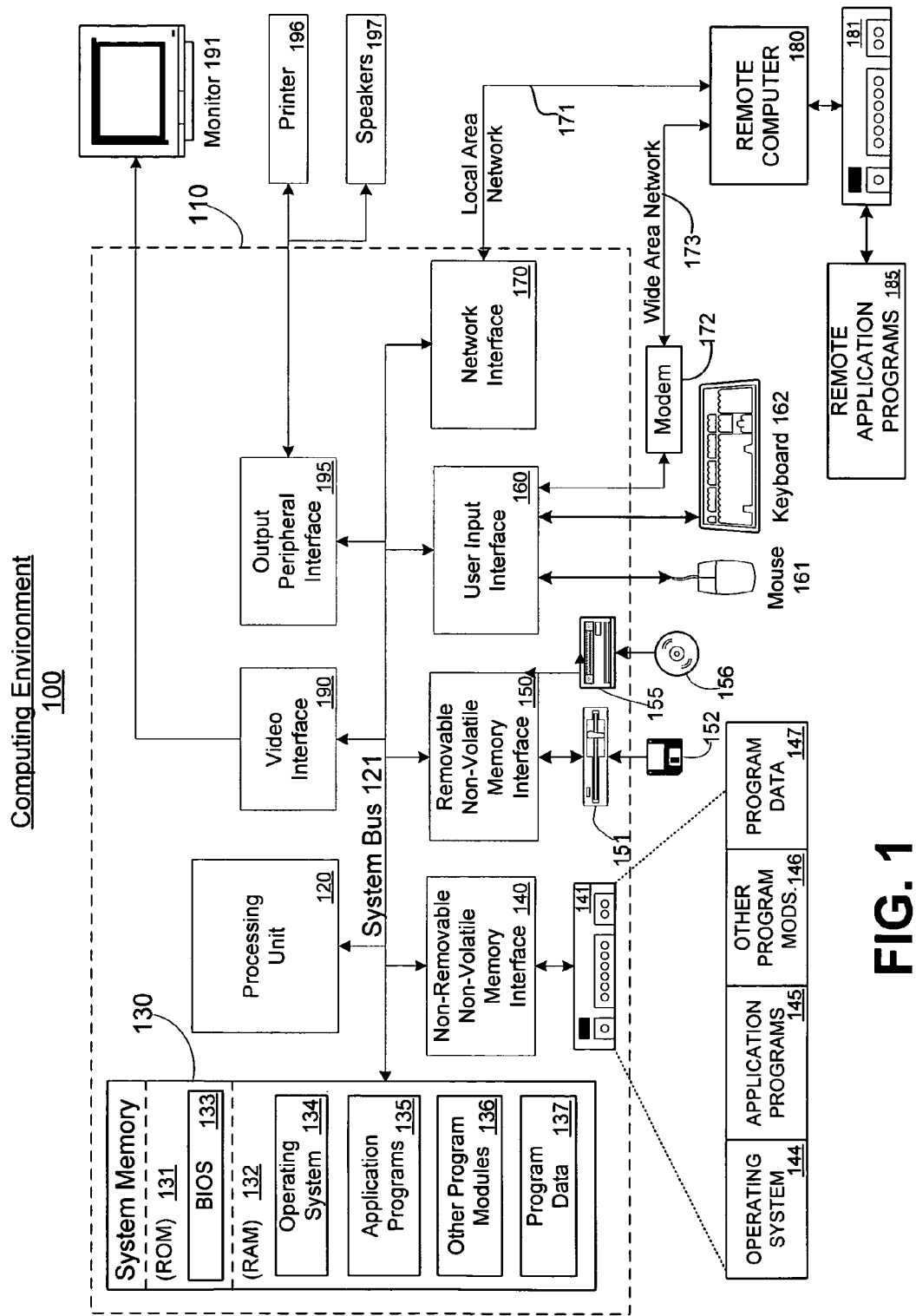
FIG. 1 is a schematic diagram illustrating an exemplary operating environment in which the invention may be implemented.

The following is a detailed description of the present invention made in conjunction with the attached figures, wherein like reference numerals will refer to like elements throughout. A mapping can be created between two objects, which may be compiled into output code for use in translating source document information into destination or target document information. While some of the implementations and aspects of the invention are illustrated and described hereinafter with respect to source and target objects which are XML schemas, the invention finds application with any type of source or target objects including, for example, schemas, databases, spreadsheets, documents, and the like. It will further be appreciated that the invention further contemplates a computer-readable storage medium having computer-executable instructions for creating a mapping in a graphical user interface.

Overview

Mapping between a source object and a destination or target object uses techniques and functoids that provide an auto-linking feature in which mappings are automatically provided based solely on source and target field names, or, ignoring field names, field locations within hierarchy. Functoids according to the present invention provide support for callout to programming artifacts, such as custom programming logic embedded in .NET assemblies or custom XSLT, and table-looping to generate and map data into a target document even though that data did not exist in the map input.

Exemplary Computing Environment

In order to provide a context for the various aspects of the invention, FIG. 1 and the following discussion are intended to provide a brief, general description of a suitable computing environment in which the various aspects of the present invention may be implemented.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented. For example, MICROSOFT®'s .NET platform includes servers, building-block services, such as web-based data storage, and downloadable device software. While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of MICROSOFT®'s .NET's languages and services, and in other distributed computing frameworks as well.

Exemplary Embodiments

Figure 2:
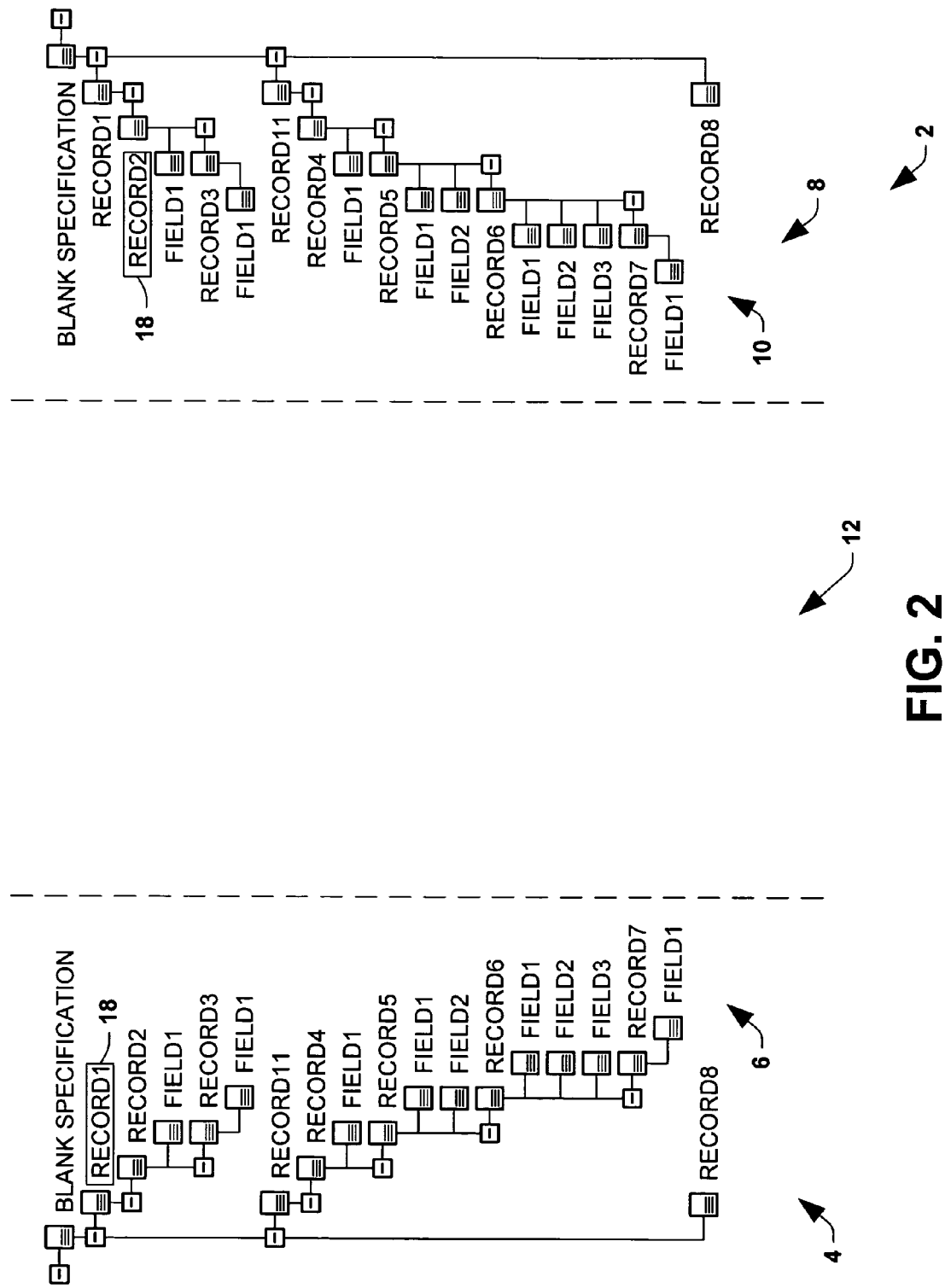
FIG. 2 is a front elevation view of an exemplary graphical user interface having a source screen region, a target screen region, and a mapping screen region for creating a mapping between a source object and a target object in accordance with the invention.

FIG. 2 illustrates an exemplary graphical user interface 2 having a source screen region 4 adapted to display a graphical representation of a source object 6, a target screen region 8 adapted to display a graphical representation of a destination or target object 10, and a mapping screen region 12 located therebetween for creating a mapping (shown at element 70, for example, in FIG. 4) between the source object 6 and the target object 10. The mapping is created by a user via the interconnection of nodes (not numerically designated) in the source and target objects 6, 10, using graphical mapping indicia (such as element 72, for example in FIG. 4). The mapper has the source and destination schemas (represented in the form of trees) which are to be mapped.

The graphical mapping indicia can comprise links and function objects or functoids in the mapping screen region 12, as illustrated and described in greater detail below. The object nodes may include root nodes, record nodes, and field nodes, which may be graphically represented in a hierarchical tree structure as described further hereinafter. The user interface 2 further comprises one or more selection indicia 18 graphically indicating that a node in the source or target objects 6 and/or 10 has been selected in regions 4 and/or 8, respectively. Moreover, connection indicia (such as element 19 in FIG. 7) may be provided in the regions 4 and/or 8 to graphically indicate that a node in the source and/or target objects 6 and/or 10 is connected or linked to another entity via the mapping.

The source and target objects 6 and 10, respectively, may comprise XML or other schemas, spreadsheets, documents, databases, and/or other information or data sources. The user interface 2 may accordingly be adapted to display the objects 6 and 10 in a hierarchical tree structure to allow for ease of mapping creation. In addition, once a mapping (e.g., mapping 70) has been created, a user may replace one or both of the source and target objects 6 and/or 10 with another information source/destination, while preserving at least a portion of the mapping and associated links. The user interface 2 accordingly maintains links, where possible, using node name association and other techniques to re-establish links with the new object or objects. In this way, a user may modify one or both of the objects 6 and/or 10 using an editor tool or the like, and then re-insert the modified object into the user interface 2 without sacrificing mapping work product.

The graphical source and target object representations may be in the form of a tree structure as shown. The tree structure may further include a hierarchical format wherein field nodes in the tree are indented from record nodes in the tree, which are turn indented from root nodes in the tree. In the exemplary source object representation 6 in region 4, for example, a field node FIELD1 is indented from its immediate parent record node RECORD2. The record node RECORD2 is indented from its immediate parent record node RECORD1, which is in turn indented from a root node BLANK SPECIFICATION. Similarly, in the target object representation 10 of region 8, a record node RECORD4 is indented from its immediate parent record node RECORD11, which in turn is indented from its parent root node BLANK SPECIFICATION. The graphical object representation 6 and 10 may include a mirrored form of indentation wherein the indentation is directed towards the mapping screen region 12 lying between the source screen region 4 and the target screen region 8. Thus, the target object representation 10 is laterally inverted with respect to that of the source tree representation 6. The mapping screen region 12 may further include a grid (as shown, for example, in FIG. 5).

A functoid toolbox can be provided (not shown). For example, the toolbox may be provided on the screen concurrent with the schemas and mapping region, perhaps residing on an otherwise unused area of the screen. The toolbox preferably contains functional units of computation called functoids (which can be used in a map) under different categories. The functoid toolbox provides functoids which fall under mathematical category like (addition, subtraction, multiplication etc). There may be other categories like String, Logical, Scientific, Advanced etc.

A VS.Net property browser can also be provided on the screen to show the properties of the selected entity in the mapper (which can be schema tree nodes, functoids, links, grid etc). The user can view/configure the properties through this property browser.

After the user creates the map, using the BizTalk Mapper for example, and compiles it, the mapper desirably generates XSLT code in the backend that will be used in the actual transformation of the input document at runtime.

Figure 3:
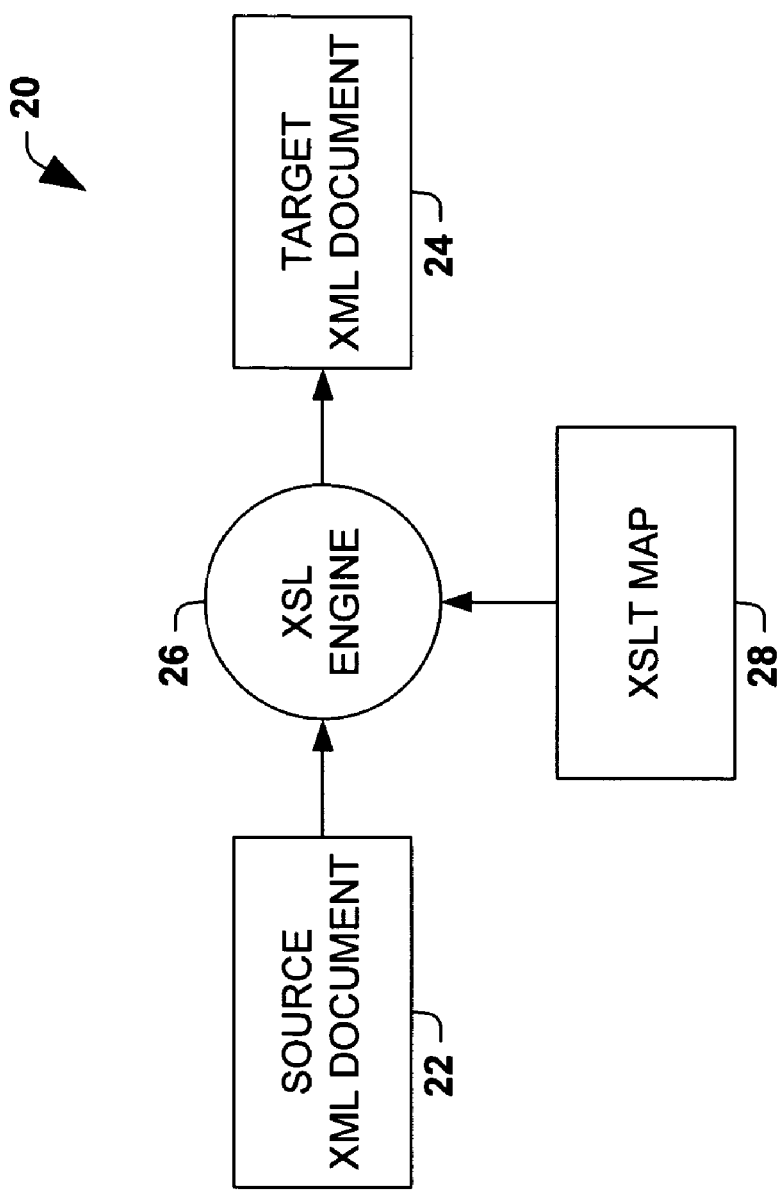
FIG. 3 is a schematic block diagram illustrating an XSL engine translating a source XML document into a target XML document according to an XSLT map created according to the invention.

Referring now to FIG. 3, an application of the invention is illustrated schematically, wherein a system 20 includes a source XML document 22, a target XML document 24, with an XSL engine 26 therebetween. The XSL engine 26 may comprise, for example, a computer system, which provides data transformations between the source XML document 22 and the target XML document 24 in accordance with an XSLT map 28 generated graphically in accordance with the invention. In this regard, the graphical user interface 2 of FIG. 2 may be used to create a mapping, which is then compiled into the computer executable instructions or codes, for example, XSLT code (e.g., map 28), and run by the engine 26 in performing the data transformation.

Figure 4:
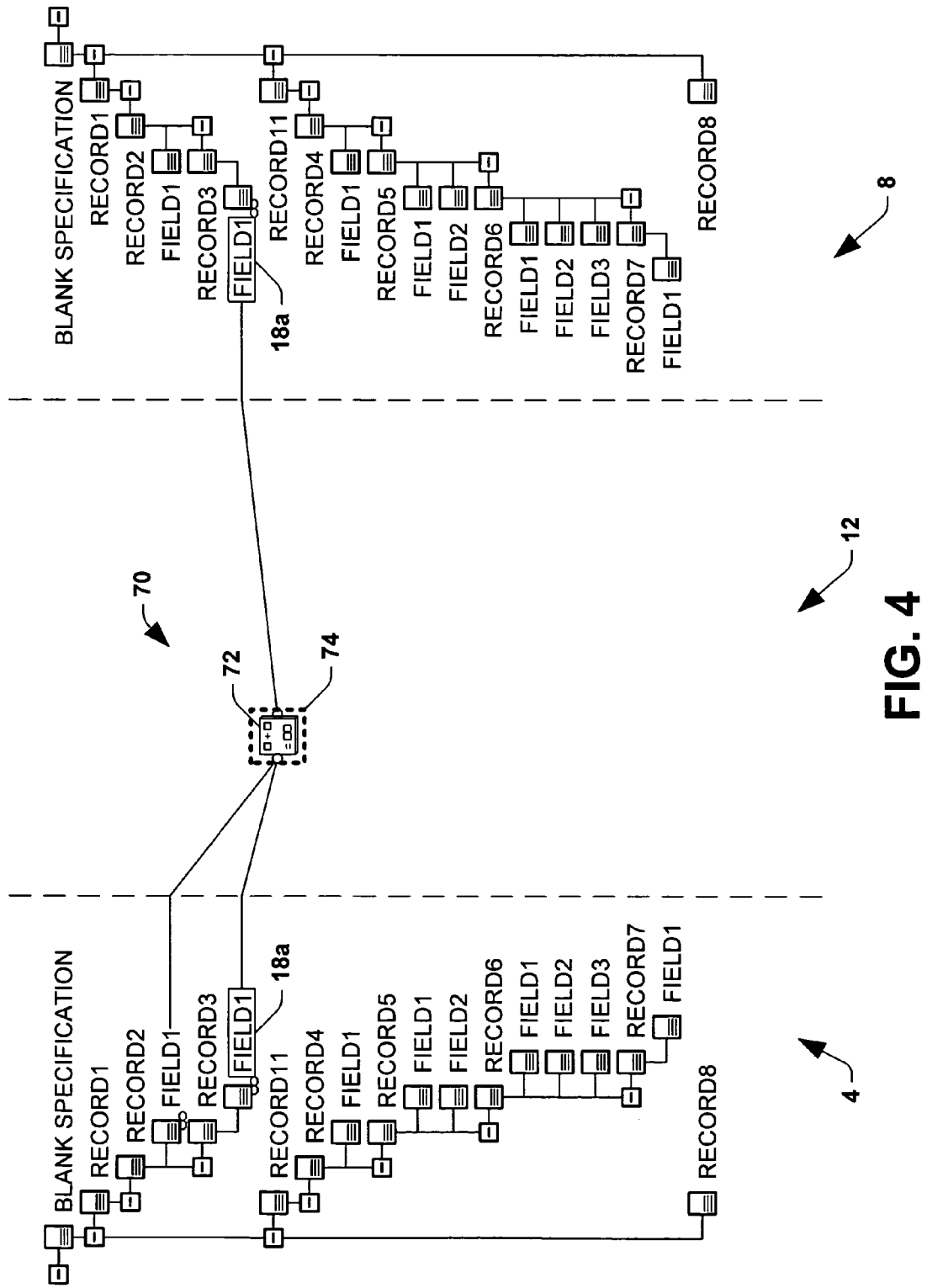
FIG. 4 is a front elevation view illustrating another exemplary user interface having a selected function object and a function object selection indicia according to the invention.

Links drawn on this grid represent data flow from source to destination. The data that is flowing through the links can be modified by applying the functoids on them. FIG. 4 shows an addition functoid taking two inputs from the source schema, and directing the output to a field in the destination schema. Thus, in FIG. 4, an exemplary mapping 70 is illustrated in mapping screen region 12 having a function object 72 linked between two source object field nodes (not numerically designated) and one target object field node. A user has selected the function object 72, whereby a function object selection indicia 74 is displayed in the mapping screen region 12 to indicate that the function object 72 has been selected. The selection of the function object 72 may be accomplished via a user interface selection device (e.g., a mouse).

Figure 5:
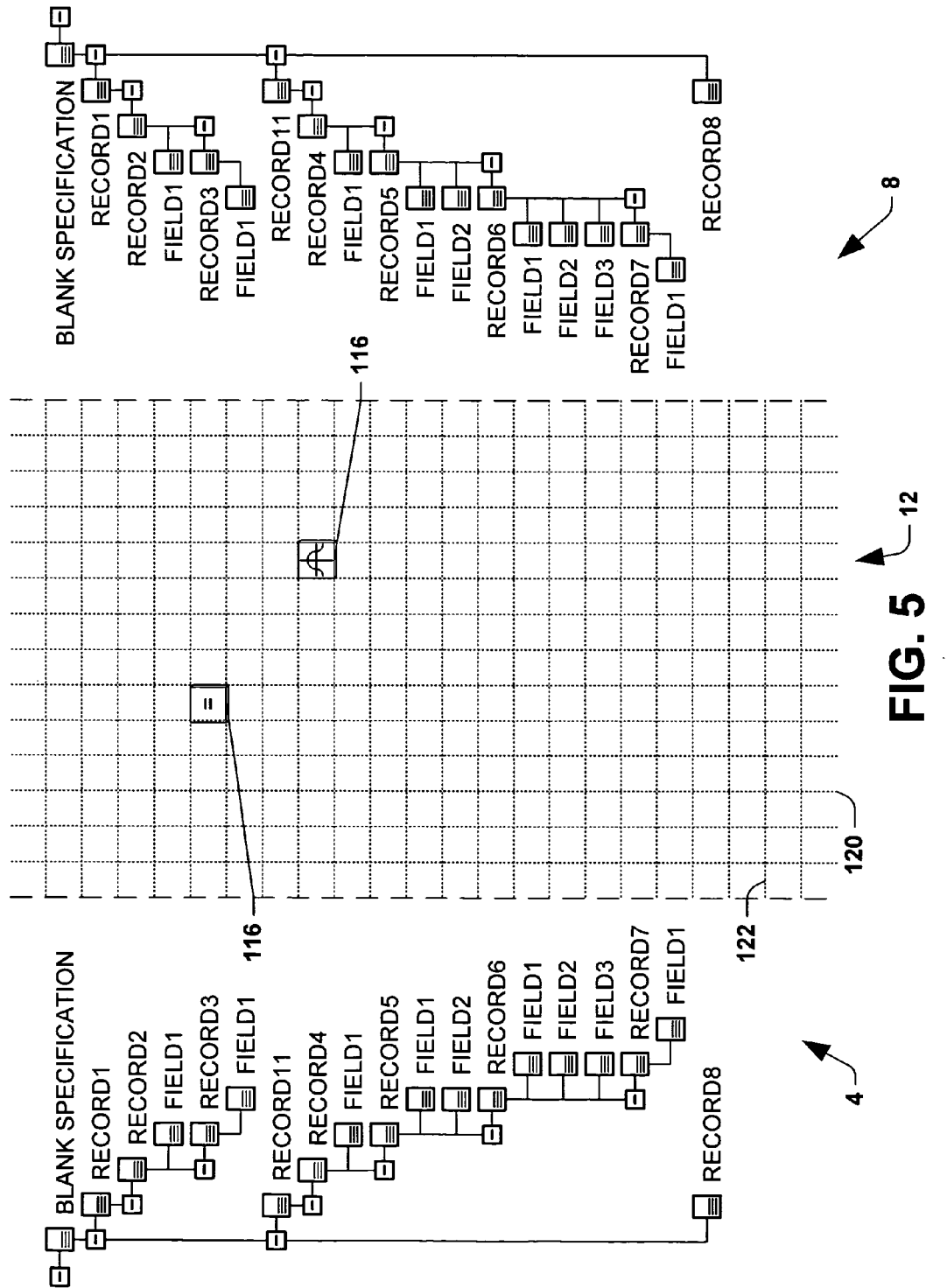
FIG. 5 is a front elevation view illustrating another exemplary user interface having a grid style mapping screen region according to the invention.

A functoid mapping grid may be provided where the user does the mapping between the source and destination schemas. Referring to FIG. 5, the mapping screen region 12 may be provided with vertical and horizontal grid lines 120 and 122, respectively, providing for orderly placement of function objects 116 in region 12, as indicated.

The mapping between source and target objects is time and labor intensive. One of the most time consuming parts of mapping is the process of ensuring that all fields are mapped. To assist with this, the present invention includes the ability to automatically provide mappings based solely on source and target field names, or, ignoring field names, field locations within hierarchy. In accordance with the present invention, a link can be drawn from a source object to a target or destination object, and the mapper will automatically map between the selected source and destination schema hierarchies.

For example, the user can draw links from the source to destination schema nodes by dragging the mouse cursor along from the source node to the destination. One contemplated technique for a user to go into the auto-linking mode of the mapper is to drag links by holding down the SHIFT key. When the user releases the mouse, the mapper will recursively perform auto-mapping between the selected source and destination schema hierarchies depending on the type of auto-mapping algorithm the user has chosen. Thus, the mapper will automatically create links between these two hierarchies recursively (records, and all their children and so on), instead of the conventional technique in which the user has to manually create links for every field under the chosen source/destination record structures.

It is contemplated that the mapper supports two kinds of techniques to achieve this auto-mapping: (a) mapping by structure (b) mapping by name. The user can choose one of these techniques before performing the auto-mapping.

Figure 6:
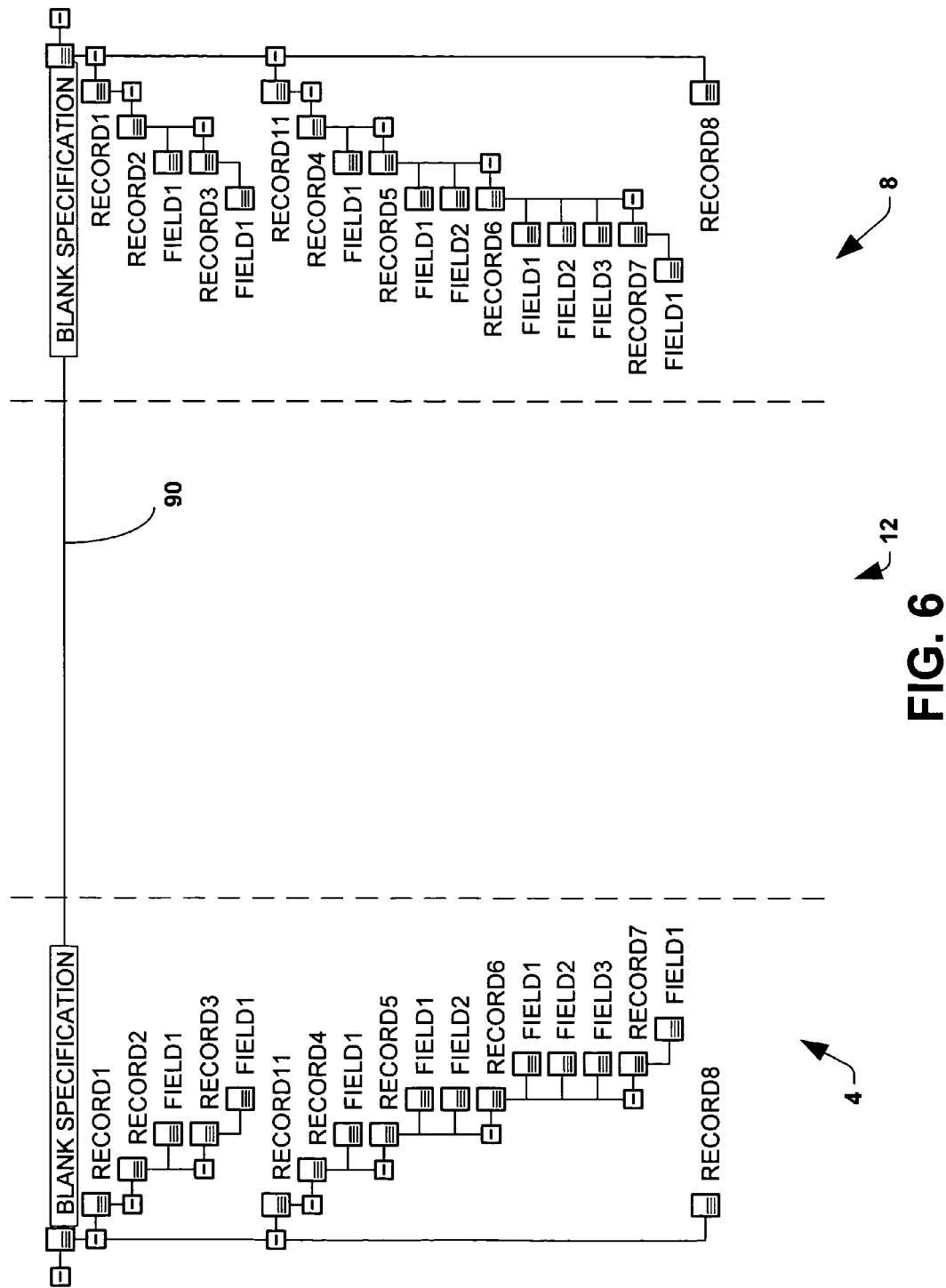
FIG. 6 is a front elevation view illustrating another exemplary user interface useful for describing aspects of auto-mapping in accordance with the present invention.

FIG. 6 shows the mapping region 12 with a link 90 that the user has drawn between the blank specification on the source side 4 and the destination side 8. After the user is done with this linking, the mapper will recursively walk down both the source and destination nodes, and create links wherever appropriate.

Figure 7:
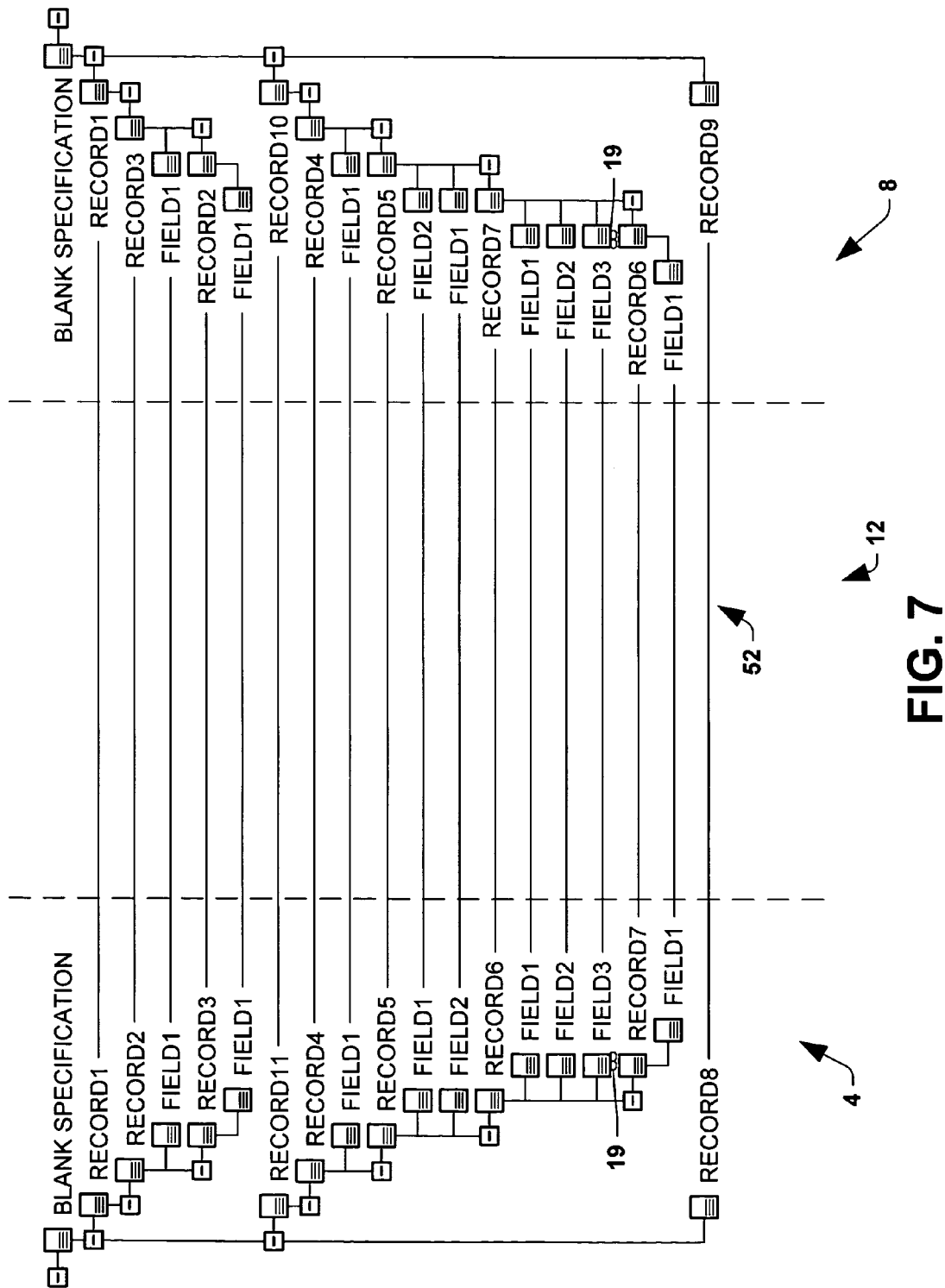
FIG. 7 is a front elevation view illustrating another exemplary user interface useful for describing further aspects of auto-mapping in accordance with the present invention.

FIG. 7 shows how mapper does the automapping with links 52 when the matching algorithm is driven mainly by the structure contained under each record. The user may choose to use this structure mapping whenever the source and destination schemas have similar structures, and he wants to do the recursive mapping (irrespective of the names of the fields/records that are being linked across).

Figure 8:
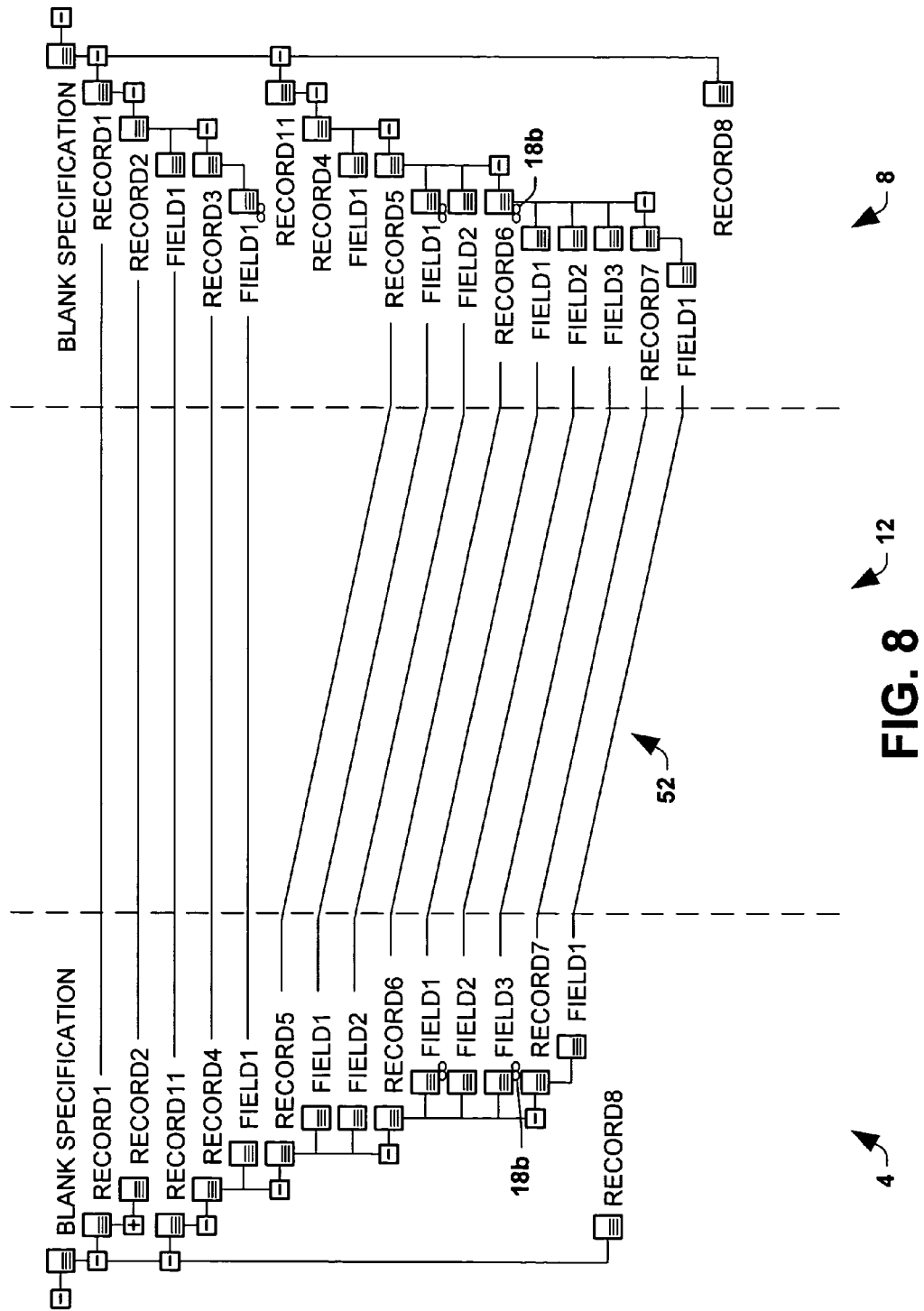
FIG. 8 is a front elevation view illustrating another exemplary user interface useful for describing further aspects of auto-mapping in accordance with the present invention.

FIG. 8 shows how mapper does the automapping when the matching algorithm is driven mainly by the names contained under each record. In FIG. 8, the source and destination schemas are similar but the destination side has some additional fields. This demonstrates how mapper would do the auto-mapping with links 52 when the matching algorithm is purely driven by the names of the nodes. A user may choose to use this name mapping whenever the source and destination schemas have similar fields with same names.

A functoid that can be used with the present invention is scriptor functoid. A scriptor functoid takes three inputs from the source document, does some computation on them, and feeds the output to the destination field. This functoid provides mechanisms for calling into external programming artifacts to perform the actual computation, thus enabling rich transformations which are not otherwise possible by just using XSLT code. It is contemplated that the scriptor functoid allows the following kinds of configurations.

The user can make calls into external .NET assemblies (in the objected oriented programming paradigm, one can think of .NET assemblies as external software components compiled, installed, and configured separately). Therefore, the user can utilize any of his existing software components to perform this computation outside of the map (and these external components can be as complex as desired).

The user can write some inline script within the functoid to perform the computation. For example, the user can type some C# code inside the functoid to do the actual work. The user can write inline scripts in almost all of the languages that are supported in the Microsoft .NET framework such as C#, VB.NET, JScript.Net etc. This is desirable if one wants to write actual code within the functoid that performs some non-trivial computation.

The user can provide a custom XSLT script (that will be executed in the context of this scripting functoid). As mentioned, the mapper buffers the user from having to even be aware of XSLT, let alone possess a familiarity with it. However, supporting non-technical users should not come at the expense of penalizing those technically able to (and possibly with a preference for) defining XSLT directly. At the same time, the full power of XSLT can be brought to bear upon any message transformation problem, without the sometimes difficult task of figuring out the correct graphical representation to achieve the desired result. It is contemplated that custom XSLT scripts are supported in two forms: parameterized call template and raw.

In the parameterized call template, the functoid can have one or more inputs. The functoid's output can go to 1) a target node, in which case the output is desirably XSLT which creates the target node and all sub-structure via inline inclusion in the map; 2) another functoid, in which case the output can be simply string or other data (i.e., XSLT not required as output in this case). An example of the second type is provided below, in which the Call-Template foo concatenates two input parameters: param1 and param2.

```
<xsl:template name="Foo" >
    <xsl:param name="Param1" />
    <xsl:param name="Parm2" />
    <xsl:value-of select="$Parm1" />-<xsl:value-of select="$Parm2" />
</xsl:template>
```

In the raw form, the functoid has no inputs, and the output must be XSLT which creates the target node and all substructure. An example is provided as follows.

```
<ContactInfo>
    <xsl:variable name="var:v5" select="'TE'" />
    <xsl:attribute name="ContactType">
        <xsl:value-of select="$var:v5" />
    </xsl:attribute>
    <xsl:variable name="var:v6" select="'541-555-8364'" />
    <xsl:attribute name="Contact">
        <xsl:value-of select="$var:v6" />
    </xsl:attribute>
</ContactInfo>
```

When the user provides Custom XSLT for the functoid, it will be included as-is in the final XSLT that is generated by the Mapper (in place of this functoid).

Thus, with these techniques of enhancing the transformations, users can create very complex maps leveraging any external software components that are developed outside the map.

Data creation in a message transformation can be supported in XSLT. However, the definition of how to create that data (i.e., generate and map data into a destination document even though that data did not exist in the input document) is a challenge that is solved using a table looping functoid in accordance with the present invention. The map creator defines a list of constants and/or dynamic (source message, database, etc.) values in a list. The list is then used to populate a table grid. The user can define as many rows and columns in the table grid as he chooses, and then the mapper can compile a looping behavior based on this table grid.

One of XSLT's features is the ability to iteratively map something in a loop. By combining that ability with the concept of that loop being driven by a table, the result is that the map can create data which can be range from hierarchically flat to very complex, and the mapper is able to generate (by compiling the graphical representation) W3C standard XSLT to build the desired map output.

Figure 9:
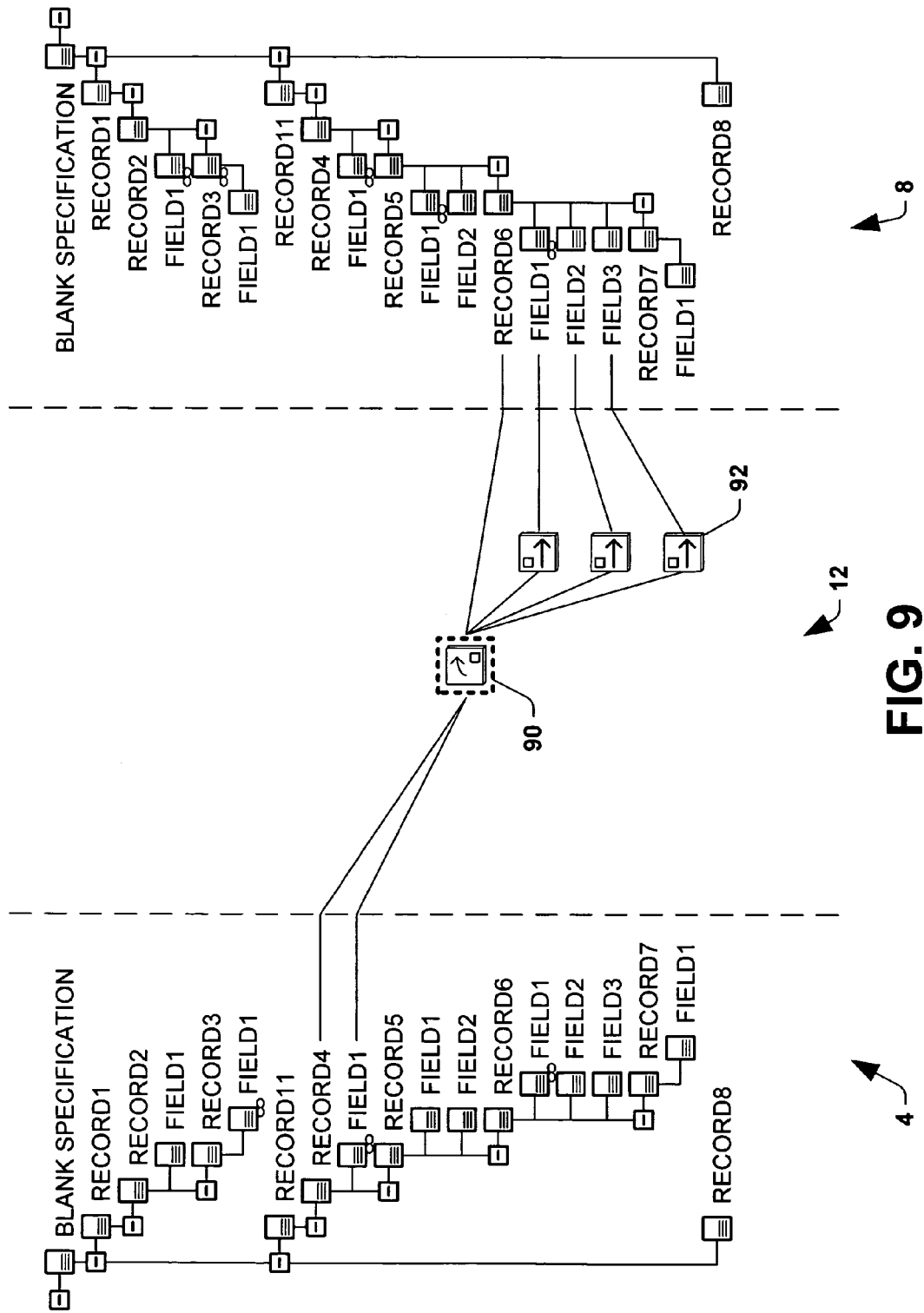
FIG. 9 a front elevation view illustrating another exemplary user interface useful for describing an exemplary table looping functoid in accordance with the present invention.

FIG. 9 shows an table-looping functoid 90 inside the mapping region 12. The user defines a table of data as a part of the configuration of this functoid 90. The three functoids 92 to the right of it are the table-extractor functoids 92 that extract a single column out of the table defined in the table-looping functoid 90.

Table 1 below shows an example of source and target schema structures used with table-driven looping. In table-driven looping, there is a scenario where the output document is based in part on data in the input document as well as, in part, on constants. Use of regular constants is not workable, however, because multiple output records with different constant values are needed, which is not supported by the conventional architecture. Also, it may be desirable to create multiple output records based on some permutation of the same input record or combinations of multiple input records. In the example shown, the "A" field needs to be filled with "1" and then "2". Also, <R2> needs to be the left ( ) of <R1> in the first case and the right( ) of <R1> in the second case.

TABLE 1 sample source and target schema structures

| Source Document | Target Document |
|---|---|
| <Root> | <Root> |
|   <R> |   <R2 A="1"> |
|     <R1>ABCDEF</R1> |     <R3>ABC</R3> |
|   </R> |   </R2> |
| </Root> |   <R2 A="2"> |
|  |     <R3>DEF</R3> |
|  |   </R2> |
|  | </R1> |

Figure 10:
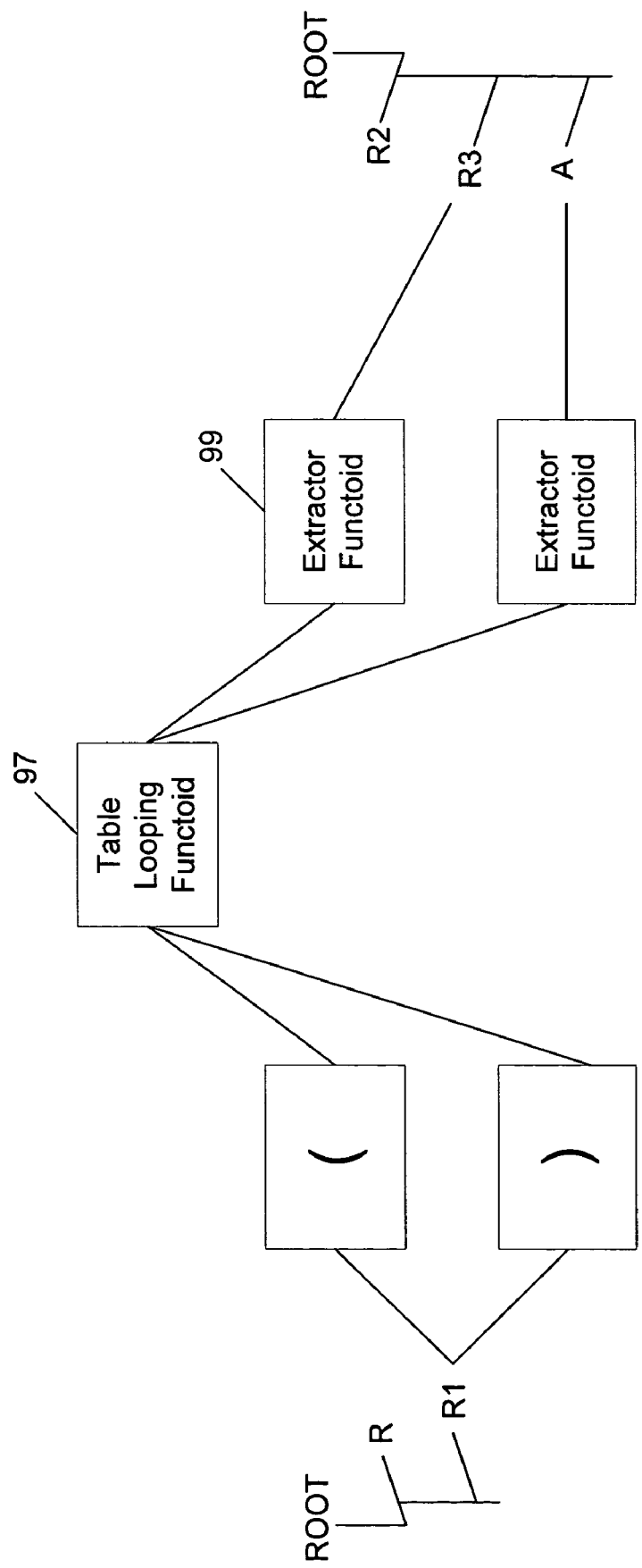
FIG. 10 is a schematic diagram useful for describing an exemplary table looping functoid in accordance with the present invention.

FIG. 10 is a schematic diagram useful for describing an exemplary table looping functoid in accordance with the present invention. In FIG. 10, source record R is parent of record R1 in source; target record R2 is parent of record R3 and field attribute A. FIG. 10 shows a table looping functoid 97 and an extractor functoid 99. The table looping functoid takes multiple link and constant inputs and allows a user to create a table of those values for output. The extractor functoid allows one to pull a particular column of data from each iteration (or row) through the table looping functoid.

Consider a mapping between a back-end representation of a purchase order to an over-the-wire format, which is more robust. Mapping requirements for creating data that has no source basis quickly exceed the capabilities of simple field-level constant value assignment. For example, assume a back end order format completely lacks several iterations of a structure that carries information about the parties to a particular business documents/transaction. The table looping functoid suite is used to create this data.

The table looper total inputs is an exhaustive list, where a user enters all possible constant data that he may need to draw upon for creation of the grid that is the "table" part of table looping.

The first input is preferably the scoping input. This indicates how many times to execute the table looping. The second input is preferably the total number of columns in the grid to be created. There can be any number of other inputs beyond these two required ones.

A table looper grid layout is a grid control that contains as many columns as indicated by the second parameter above, and as many rows as the user chooses to populate. This dialog is desirably accessed via a property browser when the looper functoid has focus. Any row with even one column populated will be considered an active row in the grid. Every cell in the grid is a dropdown from which the user can select any of the inputs specified in a "total inputs" dialog.

A table extractor column extraction involves assignment of two parameters for each extractor functoid: the first input is from the table looper itself, whereby a row is fed to the extractor; the second input is the number, left to right starting with 1, of the column being extracted.

Logically gated grid rows in an exemplary table looping functoid support the use of logical input to any row for the purpose of causing that row to only fire data to the output under a logical condition. There could be many possible uses for this, but the basic idea is to give users more control over the generation of output data through the grid.

Continuing the above example, if the user wanted to populate the same six target fields, but now also wanted to control each row of output by some logical condition, he would perform the following:

1) increment parameter 2, because parameter 2 in the "configure functoid inputs" dialog indicates the number of total columns in the grid, and because there are still six fields to be mapped, the user must have seven columns in the grid, six for data, plus one for the logical gate.
2) add logical input—there must be a logical functoid (or cascaded sequence) that feeds input to the table looping functoid. This will be the gate condition.
3) check the checkbox that tells the map compiler to put logical conditions around each row iteration.

For the table looping functoid, the compiler will walk through the table and explicitly build each of the output records with the appropriate input links, input functoid links, or constant data.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A mapping tool graphical user interface recorded on a machine-readable storage medium having computer-executable instructions, comprising: a source screen region adapted to display a graphical representation of a source object comprising a plurality of source nodes; a target screen region adapted to display a graphical representation of a target object comprising a plurality of target nodes; and a mapping screen region adapted to allow a user to create a mapping between the graphical representation of the source object and the graphical representation of the target object using at least one of (1) an auto-linking indicia, (2) a function object adapted to call out to a programming artifact, and (3) a function object adapted to provide table looping such that data is generated and mapped into a target document.

2. The user interface of claim 1, wherein the source screen region includes a source tree structure having a hierarchical representation of the source nodes, and the target screen region includes a target tree structure having a hierarchical representation of the target nodes, wherein the auto-linking indicia provides an association between one of the source nodes and one of the target nodes, and mappings between source and target nodes are automatically provided between the source and target hierarchies.

3. The user interface of claim 2, wherein after the auto-linking indicia is provided between one of the source nodes and one of the target nodes, automatic linking between the source and target nodes is performed.

4. The user interface of claim 2, wherein the mappings between source and target nodes are based on source and target node names.

5. The user interface of claim 2, wherein the mappings between source and target nodes are based on their locations within the respective hierarchies.

6. The user interface of claim 1, wherein the programming artifact comprises custom programming logic.

7. The user interface of claim 1, wherein the programming artifact comprises custom Extensible Stylesheet Language Transformations (XSLT).

8. The user interface of claim 7, wherein the custom XSLT is supported in a parameterized call template.

9. The user interface of claim 7, wherein the custom XSLT is supported in a raw form.

10. The user interface of claim 1, wherein the table looping is based on a populated grid.

11. The user interface of claim 1, wherein the auto-linking indicia comprises a line in the mapping screen region between one of the source nodes and one of the target nodes.

12. The user interface of claim 1, wherein one of the source and target objects is one of a schema, a spreadsheet, a document, and a database.

13. In a mapping tool graphical user interface recorded on a machine-readable storage medium having computer-executable instructions, a method of creating a mapping, comprising:

displaying a graphical representation of a source object in a source screen region, the source object comprising a plurality of source nodes;

displaying a graphical representation of a target object in a target screen region, the target object comprising a plurality of target nodes;

creating a mapping between the graphical representation of the source object and the graphical representation of the target object in a mapping screen region by selecting and using at least one of (1) an auto-linking indicia, (2) a function object adapted to call out to a programming artifact, and (3) a function object adapted to provide table looping such that data is generated and mapped into a target document;

and displaying the mapping in the mapping screen region.

14. The method of claim 13, further comprising selecting one of the source nodes and one of the target nodes, wherein the source screen region includes a source tree structure having a hierarchical representation of the source nodes, and the target screen region includes a target tree structure having a hierarchical representation of the target nodes, wherein the auto-linking indicia provides an association between one of the source nodes and one of the target nodes, and mappings between source and target nodes are automatically provided between the source and target hierarchies associated with the selected source node and selected target node.

15. The method of claim 14, further comprising automatic linking between the source and target nodes after receiving the auto-linking indicia between the selected source node and the selected target node.

16. The method of claim 14, wherein the mappings between source and target nodes are based on source and target node names.

17. The method of claim 14, wherein the mappings between source and target nodes are based on their locations within the respective hierarchies.

18. The method of claim 13, wherein the programming artifact comprises custom programming logic.

19. The method of claim 13, wherein the programming artifact comprises custom Extensible Stylesheet Language Transformations (XSLT).

20. The method of claim 19, wherein the custom XSLT is supported in a parameterized call template.

21. The method of claim 19, wherein the custom XSLT is supported in a raw form.

22. The method of claim 13, wherein the table looping is based on a populated grid.

23. The method of claim 13, wherein the auto-linking indicia comprises a line in the mapping screen region between one of the source nodes and one of the target nodes.

24. The method of claim 13, wherein one of the source and target objects is one of a schema, a spreadsheet, a document, and a database.

* * * * *